June 14, 1932.  R. L. FRINK  1,863,156
METHOD AND APPARATUS FOR MELTING GLASS
Filed Jan. 13, 1927    2 Sheets-Sheet 2
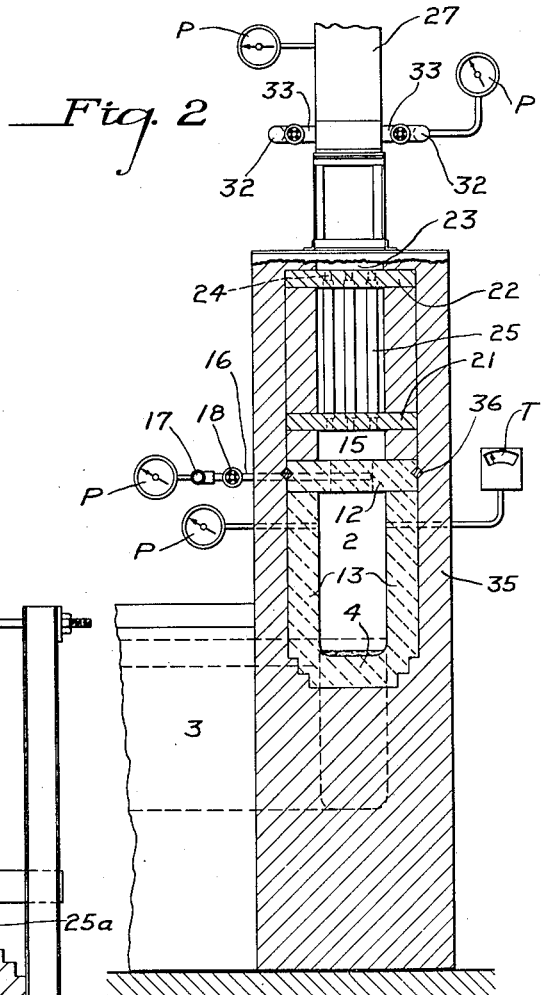
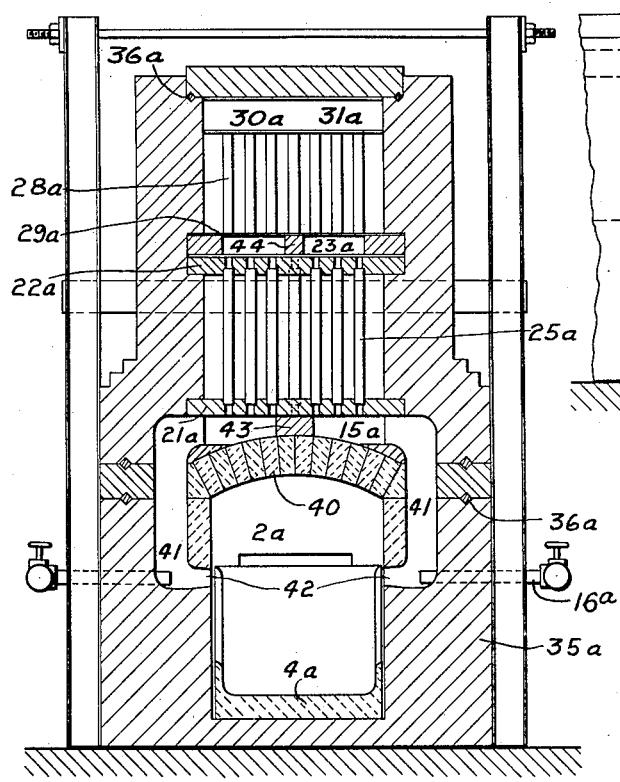
INVENTOR
Robert L. Frink Patented June 14, 1932

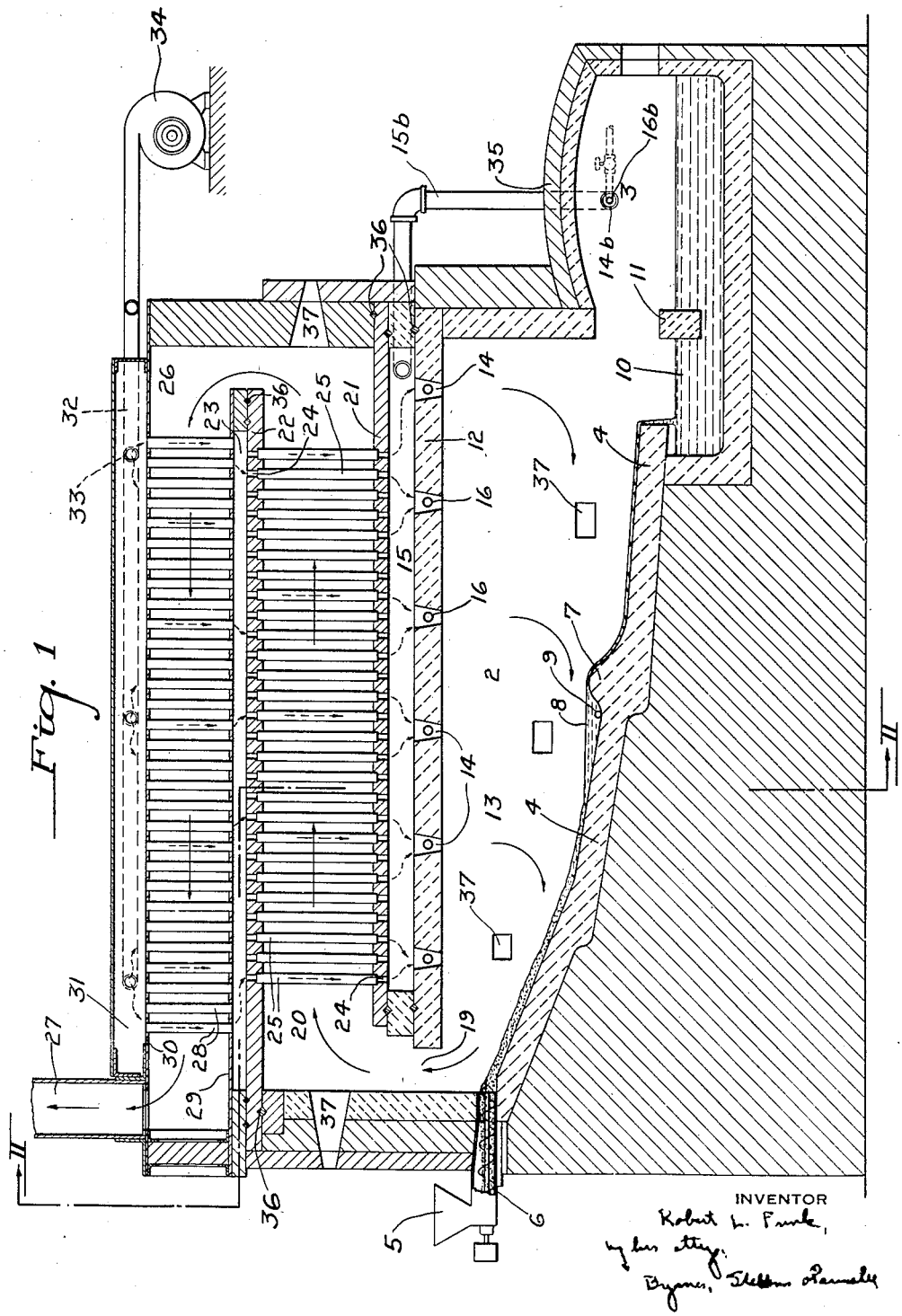

1,863,156

UNITED STATES PATENT OFFICE

ROBERT L. FRINK, OF LANCASTER, OHIO

METHOD AND APPARATUS FOR MELTING GLASS

Application filed January 13, 1927. Serial No. 160,986.

This invention relates to the melting of glass or the like, and particularly to the continuous melting thereof. The invention will be described as embodied in a furnace particularly adapted for the melting of colored glasses, or those glasses which require accurate predetermined temperature and composition of the contacting atmosphere during the melting period. The invention, however, has numerous other applications, and the furnace herein particularly described is of general utility.

Colored glasses of the better grades are generally made in pots, and while small day tanks are sometimes employed, the operation has been essentially a discontinuous one, the pot or day tank being worked out and then filled with batch and heated for many hours so as to produce a succeeding melt.

In the manufacture of certain optical glasses, such as the dense barium crowns and flints, or the dense lead flints, stria, cords and devitrification are frequently encountered.

The batch materials are of such depth in pots or day tanks that non-uniform melting is common. Extreme skill is required if the product is to have all of the desired characteristics.

The present invention eliminates most, if not all, of the difficulties heretofore encountered, and at the same time gives numerous additional advantages. The present invention has certain features in common with my co-pending application Serial No. 140,273, filed October 8th, 1926.

I provide for moving the material to be melted over a refractory support in a thin and spread out condition, and for passing hot gases thereover in a direction opposite to the direction of the travel of the material being melted. The furnace is found in practice to be capable of melting glass at a materially higher rate than ordinary furnaces now in use, and as a result, a much narrower furnace may be employed to secure the same melting capacity. This leads to economies in construction, and permits of departure from ordinary furnace practice. I provide a furnace roof made of monolithic members extending from one side wall of the furnace to the other. The ordinary built up cap is completely done away with and the furnace roof simply consists of one or more slabs of refractory material extending all the way across the furnace. Such construction is materially less expensive and will have a longer life than the ordinary furnace cap.

Instead of causing the heating gases to travel crosswise of the furnace, as is customary in continuous tanks of ordinary construction, I cause the glass to flow in one direction through the furnace and pass heating gases therethrough in the reverse direction. The heating gases are preferably supplied through burner openings in the furnace roof. The burner openings extend along a major portion of the length of the furnace instead of being confined to the charging end, as is customarily done. An off-take for the products of combustion is arranged at the charging end of the furnace and provision is made for increasing the velocity of the gases as they move toward the take-off. This results in a maximum rate of heat transfer at the charging end, which, coupled with the fact that the batch materials are in a thin and spread out condition, insures reduction of the batch constituents to glass in the shortest possible time, and gives a satisfactory time for fining of the melted glass.

The batch material being melted is caused to travel over the refractory support by gravity, and a dam is provided intermediate the ends to cause the collection of the glass in a pool in its travel down the refractory support. The physical charactersitics of the glass may be changed by the addition of a treating material, such as a gas, at this point. The refractory support extends a sufficient distance beyond the pool to insure that the glass will be fined to some degree before it reaches the end of its travel. A collecting pool is provided for holding a desired amount of molten glass, which may be taken off and used as desired.

Above the furnace roof there is arranged a heat transfer device such as a recuperator. The products of combustion give up a large amount of their heat as they leave the furnace and preheat an incoming element of combustion. It is found in practice that the stack temperature is very low, thus indicating a high efficiency for the entire apparatus. By combining the recuperator above the furnace roof with burner openings through the roof a compact and efficient furnace is secured.

It has been demonstrated by test that a furnace constructed according to my invention which has an interior width of one foot and a length of approximately twelve feet (exclusive of the working chamber), has a capacity of ten tons per day. This furnace is so small, compared to the size of ordinary furnaces of like capacities, that it presents many advantages if a change in the character of the glass being melted is desired. The furnace is constructed with a minimum number of joints, and it is found in practice that the change from one color of glass to another may be rapidly made. Only a few pounds of material need be supplied to the furnace to obtain a "washing" action sufficient to substantially clear the entire furnace from any residual glass of a color previously made. The absence of the large number of joints which is common in ordinary furnaces insures that there will be no crevices for the glass to collect in and contaminate succeeding batches.

In the accompanying drawings which illustrate the present preferred embodiment of my invention, and one modification thereof, Figure 1 is a vertical longitudinal section through a furnace, Figure 2 is a transverse section taken on the line II—II of Figure 1, and Figure 3 is a view corresponding to Figure 2 but showing a modified structure.

Referring first to Figures 1 and 2, there is shown a furnace having a melting chamber 2 and a working chamber 3. The melting chamber is relatively long and narrow, and the working chamber is extended to one side so as to provide for the reception of the required volume of glass.

The sole of the melting chamber 2 is made of a refractory slab 4 which is preferably of a monolithic character and cast in situ. The refractory slab 4, as well as the other parts forming the interior surface of the furnace, may be conveniently cast in place, as described and claimed in my copending application Serial No. 136,383. By casting the parts in place, joints throughout the melting zone are practically eliminated.

Material to be melted is supplied from a hopper 5 by a screw conveyor 6. It will be noted that the end of the conveyor adjacent the melting chamber 2 is shown as substantially filled with material. This is desirable because it forms a seal for the melting chamber and substantially prevents escape of hot gases at this point.

The material is fed to the upper end of the slab 4 and is subjected to the melting heat of the chamber 2. The supplied material, urged in part by the pressure of further material supplied from the conveyor 6, but principally by the attraction of gravity, moves downwardly on the slab 4 and is rapidly reduced to glass. A dam 7 is placed across the slab 4 and causes the collection of the molten glass in a pool 8. A treating material may be added to the glass at this point to change a physical characteristic thereof. I have shown a pipe 9 through which gases may be supplied so as to bubble through the pool 8. In this manner many colors heretofore difficult or impossible to produce on a commercial scale may be readily secured.

The glass in the pool 8 flows over the crest of the dam 7 and continues its travel along the refractory slab 4. During this last part of its travel, the glass is in process of refining and is in good condition when it flows over the bottom end of the slab to the collecting pool 10. The pool 10 is directly connected to the working chamber 3, but a dam 11 is provided to retain any stones or impurities which may float on the surface.

The roof 12 of the melting chamber 2 is made of one or more monolithic slabs extending from one side wall 13 to another, as best shown in Figure 2. The roof is provided with burner openings 14 leading from a wind box 15 to the melting chamber 2. A gaseous fuel is supplied to each burner opening 14 through pipes 16 from a gas main 17 running alongside the furnace. Each pipe 16 is provided with a separate control valve 18.

In Figure 1, I have shown a pipe 15b leading from the wind box 15 to the working chamber 3. The wind pipe terminates in a burner opening 14b supplied with gas through a pipe 16b. This burner arrangement may be used to heat the working chamber if desired. In ordinary operation the working chamber will be maintained at proper temperature by the normal melting operation. However, when the furnace is first put in operation it is desired to supply heat to the working chamber in addition to that coming from the melting chamber 2.

The flame from each of the burner openings 14 is directed downwardly but the products of combustion are all drawn toward the left hand end of the furnace as viewed in Figure 1, where a take-off 19 is provided. The take-off 19 communicates with one end of a recuperator chamber 20. The recuperator chamber 20 has a bottom wall 21 and a top wall 22. The wall 21 forms a cover for the wind box 15, and the top wall 22 forms part of an upper wind box 23. The walls 21 and 22 are provided with openings 24. These openings are counter-bored to receive recuperator tubes 25 which are arranged in rows across the recuperator chamber 20. This arrangement is found to give a high rate of heat transfer. The recuperator is easy to build, and by using a small amount of lute around the ends of the tubes it may be made gas tight.

The recuperator tubes 25 are preferably made from a refractory material which is gruel-like in consistency and is poured into holes in plaster of Paris blocks. The holes are of the size and length desired for a recuperator tube. No core is employed, and the holes are filled completely with the tube material. The plaster of Paris mold quickly absorbs water from the cast material in its outer portions, and as a result the outer portions of the cast material are solid, or semisolid, while the central portion is still fluid. The mold is then inverted or opened at the bottom and the still fluid portion of the cast material is permitted to flow out. By allowing a suitable time interval between the pouring of the material and the removal of the fluid center, a tube of any desired thickness may be made. This method is particularly desirable for making recuperator tubes, as it leaves a rough interior wall. The rough wall insures better contact of air with the wall, and also provides a larger area, thereby insuring maximum heat transfer efficiency.

After the products of combustion have traversed the length of the recuperator chamber 20, they pass upwardly to a recuperator chamber 26. The recuperator chamber 26 extends along the top of the furnace and is connected to a stack 27. By the time the gases reach the recuperator chamber 26 they have been materially reduced in temperature and therefore metallic tubes 28 are employed. These tubes terminate in tube plates 29 and 30. The tube plate 29 forms the top of the wind box 23, while the tube plate 30 forms the bottom of a wind box 31. Supply pipes 32 extend along either side of the wind box 31 and are connected thereto at intervals through valved pipes 33. This arrangement insures proper distribution of air through the tubes of both recuperators, and thus increases the efficiency. Air is fed to the supply pipes 32 from a fan 34.

It will be noted that the tubes 28 in the upper bank are staggered with relation to the tubes 25 in the lower bank.

As previously pointed out, it is desired to make the various sections of the furnace substantially monolithic in character so as to have a minimum number of joints. The outside of the furnace will be covered with suitable insulating bricks, such as sil-o-cel, 35. Wherever a gas tight joint is desired, as, for example, around the wind boxes, I form corresponding grooves in adjacent furnace members and fill the openings thus formed with a cementitious material, as indicated at 36.

Suitable sight openings 37 are provided at various parts of the apparatus. These openings will be supplied with closures of any desired type. Suitable indicators such as pressure gauges P, pyrometers T, $CO_2$ recorders, etc., may be employed at various parts of the apparatus.

It will be seen from Figure 1 that the slab 4 comes closer and closer to the roof 12 as the inlet end of the furnace is approached. Due to the fact that substantially all of the products of combustion find their outlet through the opening 19 and that each burner contributes an additional volume of such products, it is evident that the velocity of the combustion gases will rapidly increase from the right hand end of the furnace towards the left hand end. This condition is desirable. As the velocity of the gases over the molten materials increases the coefficient of heat transfer correspondingly increases. Therefore most of the melting will be accomplished at the left hand end of the furnace adjacent the point of inlet of the material which is supplied.

Figure 3 illustrates a modified structure which may be employed for wider furnaces. Here parts corresponding to similar parts in Figures 1 and 2 have been given similar reference characters with an $a$ suffixed thereto. In this case an arched roof 40 is provided for the melting chamber 2a, and in order to avoid any possibility of the arch being burned out, the wind box 15a is connected through conduits 41 to ports 42 on the sides of the melting chamber. In this embodiment, as in the embodiment of Figures 1 and 2, the products of combustion are taken off at an opening at the end of the furnace where material to be melted is supplied. In order to prevent the slab 21a from cracking at the center, due to its increased width, supporting blocks 43 are provided. Similarly the tube plate 29a is provided with blocks 44.

I have illustrated and described a preferred embodiment of the invention and one modification thereof. It will be understood, however, that it is not limited to the form shown, as it may be otherwise embodied or practiced within the scope of the following claims:—

I claim:

1. The method of melting glass which comprises moving the material to be melted over a refractory support in a thin and spread-out condition, passing hot gases thereover in a direction opposite to the direction of travel of the material being melted, and increasing the velocity of the gases as they travel over the material.

2. The method of melting glass in a furnace which comprises supplying material to be melted at one end of a furnace, passing the material in a thin and spread-out condition through the furnace, withdrawing melted glass from the other end thereof, passing heated gases through the furnace in a reverse direction and increasing the velocity of the gases during their travel.

3. The method of melting glass which comprises moving the material over an inclined stationary refractory support, directing hot gases downwardly onto the material on the support, and then causing such gases to move over the material in a direction opposite to the direction of travel of the material and increasing the velocity of the gases during such travel.

In testimony whereof I have hereunto set my hand.

ROBERT L. FRINK.